March 6, 1951     O. J. BLANCHET     2,544,580
RAIN-DRAIN ATTACHMENT FOR AUTOMOBILE TOPS
Filed Feb. 4, 1949
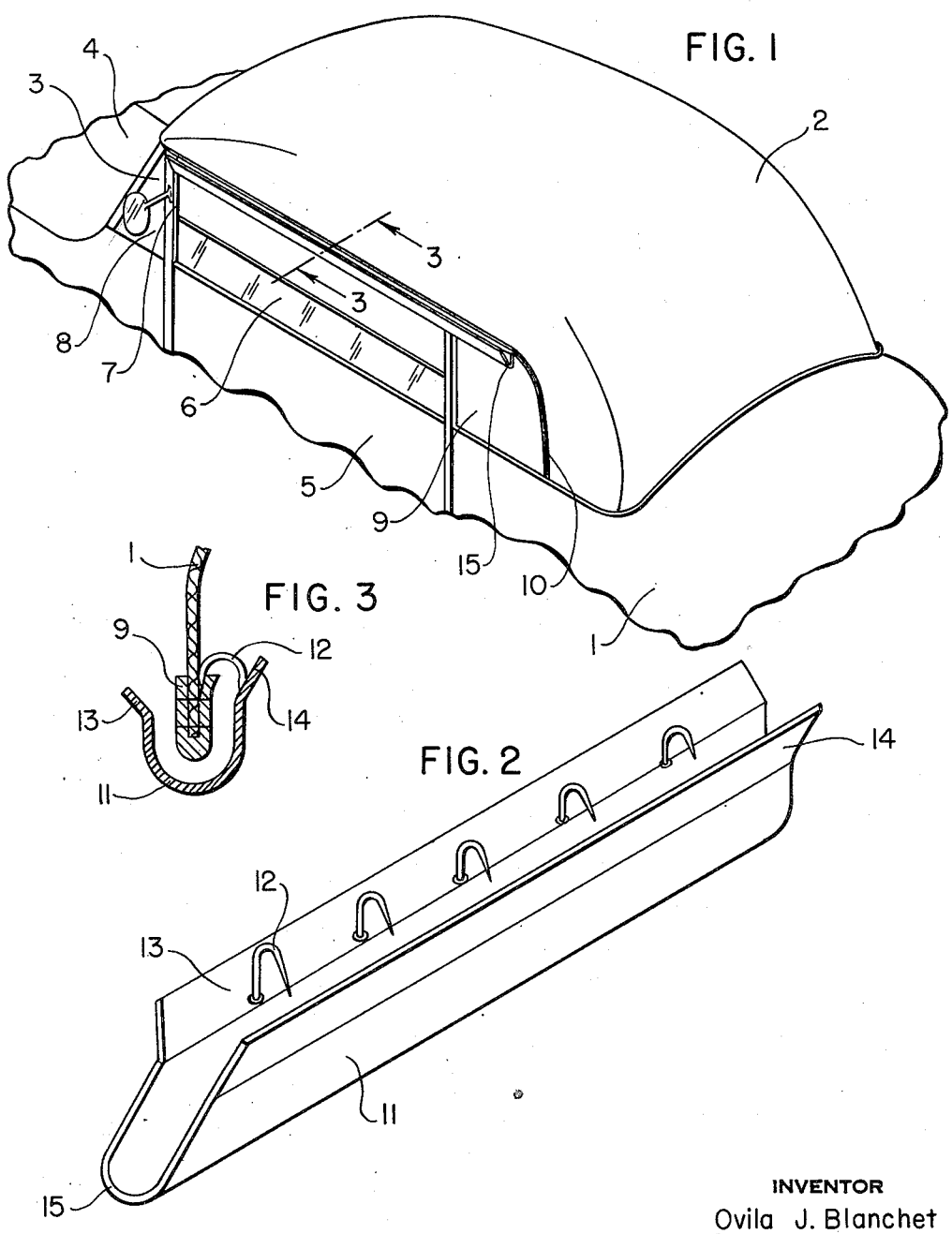
INVENTOR
Ovila J. Blanchet
BY
William F. Nickel
ATTORNEY Patented Mar. 6, 1951

2,544,580

UNITED STATES PATENT OFFICE 2,544,580

RAIN-DRAIN ATTACHMENT FOR AUTOMOBILE TOPS

Ovila J. Blanchet, New Bedford, Mass.

Application February 4, 1949, Serial No. 74,550

1 Claim. (Cl. 296—135)

This invention is an improved attachment for the top of an automobile, especially an automobile of the convertible type having a top of fabric supported by a framework that can be collapsed and put up at will, so that the top can be raised and lowered.

Motor cars of this description are equipped with windows at the sides, but the upper edges of the windows do not fit the outer edges of a convertible top snugly; and in rainy weather drops of water running down from the top will streak the windows, flow across their upper edges, and enter the body of the car; thus causing discomfort to the occupants and interfering with the driver's vision. An important object of this invention is to prevent such trouble by intercepting water along the upper edges of the windows and conducting it away to points where it will clear the windows as it flows down the outside of the car.

To this end, the improvement embodies a drain trough which can be easily secured to the sides of the top of the car to collect water and discharge it rearward. The trough is simple and efficient, and can be readily mounted in the required position.

The nature and advantages of the invention are fully set forth herein; but I may of course adopt changes in details not necessarily described, but within the scope and principle of the invention as defined by the general meanings of the terms in which the appended claims are expressed.

On the drawings:

Figure 1 is a perspective view of an automobile having my improvement connected to the top.

Figure 2 is a side view of the improvement; and

Figure 3 is a section on the line 3—3 of Figure 1.

The numeral 1 indicates part of the body of an automobile having a top 2 of a material that enables the top to be raised and lowered. It is supported by a frame, not shown, which is pivotally mounted on the body of the car and includes parts pivotally united to one another so that the frame can be extended or collapsed. When the top 2 is raised, it covers the entire body of the car and the front thereof rests upon the upper edge of the frame of the windshield 3, which is at the rear of the hood 4 over the engine.

In the side of the car is a door 5, carrying a pane of glass 6. This pane or window can be raised and lowered from the inside of the car and it slides up and down in channelled guideways 7 mounted on the body at either side of the door, or on the door itself. Beside the door are windows 8 and 9, which are either fixed in place or mounted in the well known manner to be movable up and down or to swing in and out. Along the edge of the top is a bead or doubled lining strip 10.

The attachment to intercept the water above the windows has the form of a trough 11 with a rounded bottom, and is open at both ends. To it hooks 12 are affixed. By these hooks the trough is suspended from the top, preferably in such position that it extends at an incline to the horizontal from the front of the automobile to the rear. The edges are bent outward to form an inner rim 13 and an inner rim 14. The latter is higher, so that if the trough fills, the overflow of the water will take place across the rim 13, outside, and not run down inside the automobile.

The member 11 is suspended from the hooks 12, which are pushed into the inner face of the top along the bead or strip 10. The hooks can be affixed to the top in any suitable way. The top 2 will usually slope from the front to rear and the bead 10 will have the same inclination. The trough 11 will therefore be hung so that it also slopes rearward and will discharge through its open rear end 15.

If desired the hooks at the end 15 can be longer to assure the necessary slope when the trough 11 is in place.

The attachment can of course be used on cars and a cloth top such as is above described. The trough can be made of metal, fiber, plastic, or any other material capable of serving the purpose.

Having described my invention, what I believe and claim to be new is:

A drain member for attachment to the top covering of a vehicle having a downturned edge having a lining strip covering said edge, said member comprising a trough having an open end and hooks affixed to one side of the trough and turned inward to engage the strip at its upper portion to suspend the trough at an incline from the edge of the top, the hooks holding the trough in position to envelop the downturned edge on both inner and outer faces, said trough having outward bent edges along its sides, the inner of said bent edges being higher than the outer.

OVILA J. BLANCHET.

(References on following page)

REFERENCES CITED

The following references are of record in the file of this patent:

UNITED STATES PATENTS

| Number | Name | Date |
|---|---|---|
| 1,207,082 | Saunders | Dec. 5, 1916 |
| 1,651,910 | Schemmel | Dec. 6, 1927 |
| 1,884,441 | Welch | Oct. 25, 1932 |
| 1,958,527 | Williams | May 15, 1934 |
| 2,039,208 | Billman | Apr. 28, 1936 |

FOREIGN PATENTS

| Number | Country | Date |
|---|---|---|
| 292,230 | Great Britain | June 14, 1928 |